US012724583B2

(12) United States Patent
Bao

(10) Patent No.: US 12,724,583 B2
(45) Date of Patent: Sep. 1, 2026

(54) AUDIO PLAYING CONTROL METHOD AND AUDIO OUTPUT DEVICE

(71) Applicant: GUANGDONG OPPO MOBILE TELECOMMUNICATIONS CORP., LTD., Dongguan (CN)

(72) Inventor: Jianquan Bao, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 326 days.

(21) Appl. No.: 18/595,091

(22) Filed: Mar. 4, 2024

(65) Prior Publication Data

US 2024/0211202 A1 Jun. 27, 2024

Related U.S. Application Data

(63) Continuation of application No. PCT/CN2022/113864, filed on Aug. 22, 2022.

(30) Foreign Application Priority Data

Sep. 8, 2021 (CN) ......................... 202111049009.8

(51) Int. Cl.
*G06F 3/16* (2006.01)
*H04R 3/00* (2006.01)
(Continued)

(52) U.S. Cl.
CPC ............... *G06F 3/165* (2013.01); *H04R 3/00* (2013.01); *H04W 4/80* (2018.02); *H04W 76/10* (2018.02);
(Continued)

(58) Field of Classification Search
CPC .. G06F 3/165; G06F 3/16; H04R 3/00; H04R 2420/07; H04R 2430/01; H04R 1/1016;
(Continued)

(56) References Cited

U.S. PATENT DOCUMENTS 8,069,051 B2 * 11/2011 Lindahl .................. G11B 27/28 381/94.4
9,172,792 B2 * 10/2015 Lin ..................... H04M 1/6066
(Continued)

FOREIGN PATENT DOCUMENTS

CN 101401452 A 4/2009
CN 110199535 A 9/2019
(Continued)

OTHER PUBLICATIONS

International Search Report in International Application No. PCT/CN2022/113864, mailed Nov. 11, 2022.
(Continued)

*Primary Examiner* — Jinsong Hu
*Assistant Examiner* — Rui M Hu
(74) *Attorney, Agent, or Firm* — Ladas & Parry, LLP

(57) ABSTRACT

An audio playing control method and an audio output device are provided. The method is performed by the audio output device and includes: receiving a second piece of audio data transmitted from a second terminal device when a first terminal device transmits a first piece of audio data to the audio output device; determining a target piece of audio data from the first piece of audio data and the second piece of audio data; and playing the target piece of audio data and performing a first processing operation corresponding to a non-target piece of audio data to prevent the audio output device from outputting the non-target piece of audio data, wherein the non-target piece of audio data is another piece of audio data of the first piece of audio data and the second piece of audio data other than the target piece of audio data.

14 Claims, 7 Drawing Sheets

(51) Int. Cl.
*H04W 4/80* (2018.01)
*H04W 76/10* (2018.01)

(52) U.S. Cl.
CPC ...... *H04R 2420/07* (2013.01); *H04R 2430/01* (2013.01)

(58) Field of Classification Search
CPC .... H04R 2420/01; H04R 5/04; H04R 1/1041; H04W 4/80; H04W 76/10; H04W 76/15; H04S 2400/13; Y02D 30/70
See application file for complete search history.

(56) References Cited

U.S. PATENT DOCUMENTS

| | | | | |
|---|---|---|---|---|
| 9,900,827 | B2 * | 2/2018 | Song | H04W 4/80 |
| 11,080,011 | B1 * | 8/2021 | Denis | G06F 3/165 |
| 2007/0206829 | A1 * | 9/2007 | Weinans | H04M 1/6066 381/370 |
| 2010/0151791 | A1 * | 6/2010 | Yi | H04W 76/36 455/41.3 |
| 2015/0146881 | A1 * | 5/2015 | Malsbary | G06F 3/165 381/80 |
| 2016/0299739 | A1 * | 10/2016 | Song | G06F 3/165 |
| 2016/0360018 | A1 * | 12/2016 | Watson | H04W 76/36 |
| 2017/0134888 | A1 * | 5/2017 | Innes | H04N 21/4122 |
| 2018/0046429 | A1 * | 2/2018 | Jensen | G06F 13/426 |
| 2019/0182331 | A1 * | 6/2019 | You | B60K 35/26 |
| 2020/0162852 | A1 * | 5/2020 | Xu | G11B 27/10 |
| 2021/0099812 | A1 * | 4/2021 | Dickmann | H04R 25/554 |
| 2021/0255823 | A1 * | 8/2021 | Kim | G06F 3/165 |
| 2022/0007201 | A1 * | 1/2022 | Högberg | H04R 25/505 |
| 2022/0116492 | A1 * | 4/2022 | Zhu | H04M 1/6066 |
| 2022/0229628 | A1 * | 7/2022 | Lee | G06F 3/165 |
| 2023/0020019 | A1 * | 1/2023 | Bhowmik | H04R 25/554 |
| 2023/0049548 | A1 * | 2/2023 | Zhang | G06F 3/165 |
| 2023/0195409 | A1 * | 6/2023 | Choi | G06F 3/162 381/58 |
| 2023/0353917 | A1 * | 11/2023 | Goh | H04R 1/00 |
| 2024/0056720 | A1 * | 2/2024 | Jin | H04R 5/04 |
| 2024/0364803 | A1 * | 10/2024 | Jin | H04M 1/6066 |
| 2025/0247459 | A1 * | 7/2025 | Peng | H04M 1/6066 |

FOREIGN PATENT DOCUMENTS

| | | | |
|---|---|---|---|
| CN | 111372159 | A | 7/2020 |
| CN | 111818503 | A | 10/2020 |
| CN | 112596907 | A | 4/2021 |
| CN | 113127190 | A | 7/2021 |
| CN | 113225693 | A | 8/2021 |
| WO | 2023035918 | A1 | 3/2023 |

OTHER PUBLICATIONS

Written Opinion of the International Searching Authority in International Application No. PCT/CN2022/113864, mailed on Nov. 11, 2022.

Office Action in Chinese Patent Application No. 202111049009.8, mailed Aug. 6, 2025.

First Office Action and search report from the Chinese Patent Application No. 202111049009.8, mailed Mar. 19, 2025.

Chinese Rejection decision corresonding, Chinese Application No. 202111049009.8, mailed Jan. 13, 2026 (26 pages).

* cited by examiner

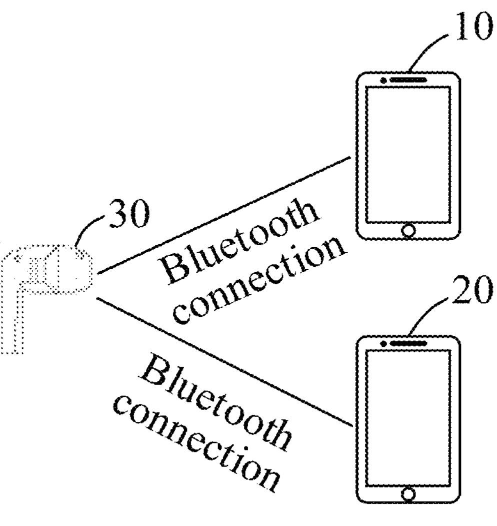

FIG. 1 receiving a second piece of audio data transmitted from the second terminal device to the audio output device when the first terminal device transmits a first piece of audio data to the audio output device — 202

↓ determining a target piece of audio data from the aforesaid first piece of audio data and the aforesaid second piece of audio data — 204

↓ playing the target piece of audio data and performing a first processing operation corresponding to a non-target piece of audio data to prevent the audio output device from outputting the non-target piece of audio data, wherein the non-target piece of audio data is another piece of audio data of the first piece of audio data and the second piece of audio data other than the target piece of audio data — 206

FIG. 2

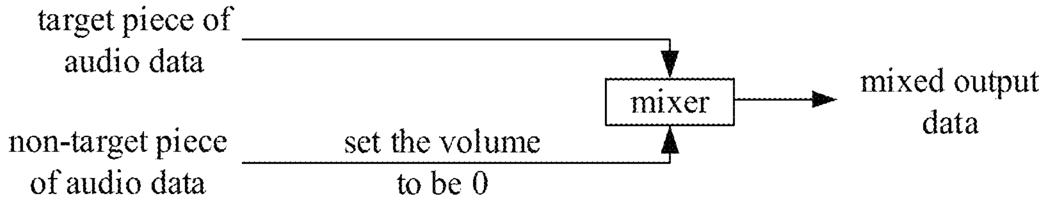

FIG. 5 receiving a second piece of audio data transmitted from the second terminal device to the audio output device when the first terminal device transmits a first piece of audio data to the audio output device — 602 determining a priority of each of the first piece of audio data and the second piece of audio data based on a service type of the each of the first piece of audio data and the second piece of audio data and determining a piece of audio data of the first piece of audio data and the second piece of audio data with the greatest priority as the target piece of audio data — 604 playing the target piece of audio data in response to a service type corresponding to a non-target piece of audio data being a call service, and transmitting a call processing instruction to a non-target terminal device, wherein the non-target piece of audio data is another piece of audio data of the aforesaid first piece of audio data and the aforesaid second piece of audio data other than the target piece of audio data, the non-target terminal device is a terminal device of the first terminal device and the second terminal device that transmits the non-target piece of audio data to the audio output device, the call processing instruction is configured to trigger the non-target terminal device to stop transmitting the non-target piece of audio data to the audio output device and perform a second processing operation corresponding to the call service of the non-target terminal device — 606 responding to a third switch instruction, stopping playing the target piece of audio data based on the third switch instruction, and playing the aforesaid non-target piece of audio data — 608

FIG. 6 transmitting a first piece of audio data to the audio output device, wherein when the audio output device receives a second piece of audio data transmitted from the second terminal device, the first piece of audio data is configured to enable the audio output device to determine a target piece of audio data from the first piece of audio data and the second piece of audio data, play the target piece of audio data, and perform a first processing operation corresponding to a non-target piece of audio data to prevent the audio output device from outputting the non-target piece of audio data, wherein the non-target piece of audio data is another piece of audio data of the first piece of audio data and the second piece of audio data other than the target piece of audio data

Figures 8, 9:
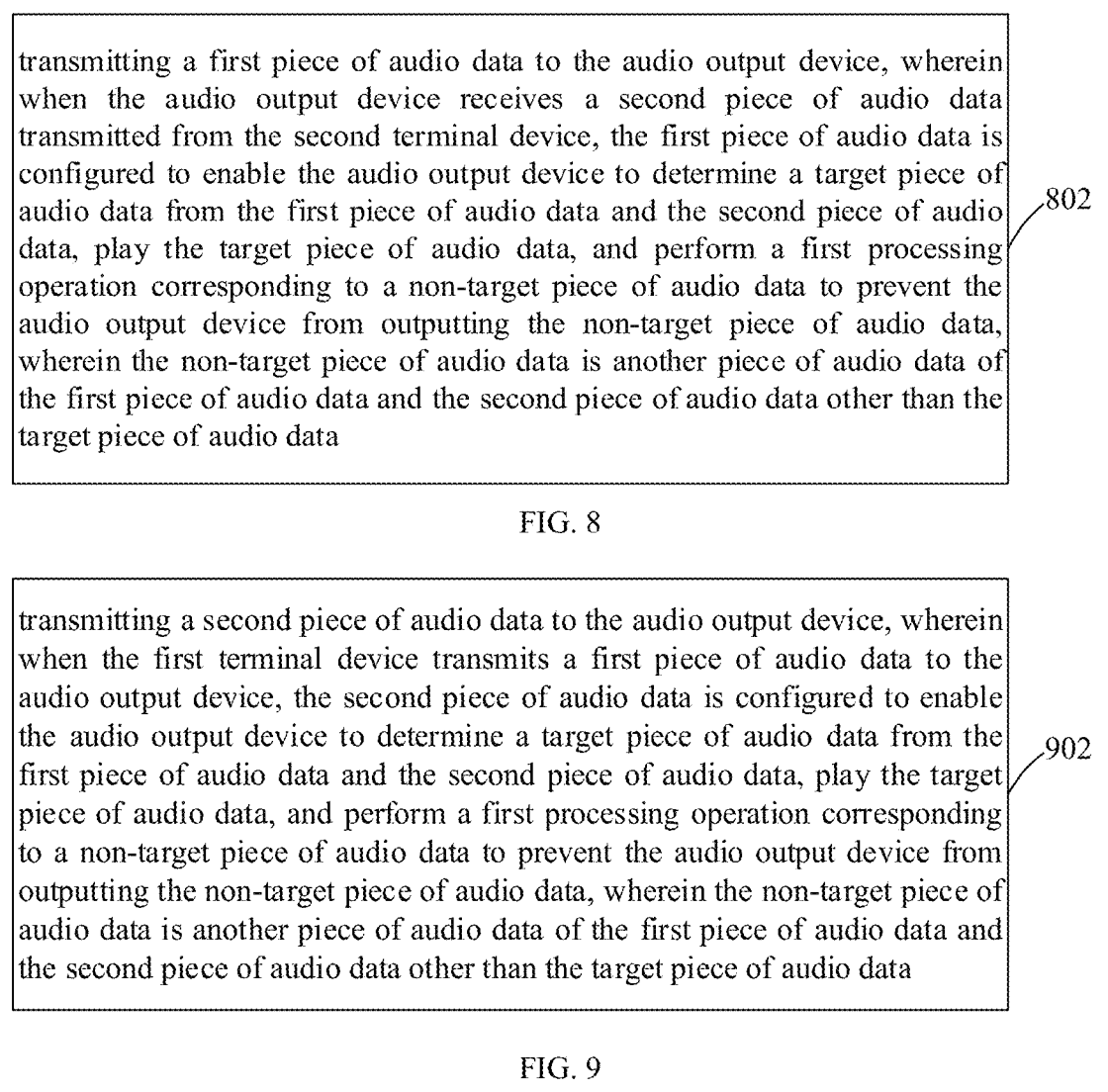

802

FIG. 8 transmitting a second piece of audio data to the audio output device, wherein when the first terminal device transmits a first piece of audio data to the audio output device, the second piece of audio data is configured to enable the audio output device to determine a target piece of audio data from the first piece of audio data and the second piece of audio data, play the target piece of audio data, and perform a first processing operation corresponding to a non-target piece of audio data to prevent the audio output device from outputting the non-target piece of audio data, wherein the non-target piece of audio data is another piece of audio data of the first piece of audio data and the second piece of audio data other than the target piece of audio data

AUDIO PLAYING CONTROL METHOD AND AUDIO OUTPUT DEVICE

CROSS-REFERENCE TO RELATED APPLICATIONS

The present application is a continuation of International Patent Application No. PCT/CN2022/113864, filed Aug. 22, 2022, which claims priority to Chinese Patent Application No. 202111049009.8, filed Sep. 8, 2021, both of which are herein incorporated by reference in their entirety.

TECHNICAL FIELD

The present disclosure relates to the field of Bluetooth communication technologies, and particularly to an audio playing control method and an audio output device.

BACKGROUND

When using a terminal device (such as a smartphone, a tablet, a smart wearable device, etc.), the user may usually connect the terminal device with an audio output device (such as an earphone, a loudspeaker box, etc.) for communication. Then the audio output device may receive audio data transmitted by the terminal device and play the audio data. However, in practice, it is found that when the audio output device faces audio data from multiple terminal devices at the same time, difficulties or even failures in connection may occur. The stability of the communication connections between the audio output device and the terminal devices is low, and the stability and reliability of outputting audio by the audio output device is low.

SUMMARY

Embodiments of the present disclosure disclose an audio playing control method and an audio output device.

In a first aspect, some embodiments of the present disclosure provide an audio playing control method performed by an audio output device, wherein the audio output device is configured to establish a Bluetooth connection with each of a first terminal device and a second terminal device, and the method includes: receiving a second piece of audio data transmitted from the second terminal device to the audio output device when the first terminal device transmits a first piece of audio data to the audio output device; determining a target piece of audio data from the first piece of audio data and the second piece of audio data; and playing the target piece of audio data and performing a first processing operation corresponding to a non-target piece of audio data to prevent the audio output device from outputting the non-target piece of audio data, wherein the non-target piece of audio data is another piece of audio data of the first piece of audio data and the second piece of audio data other than the target piece of audio data.

In a second aspect, some embodiments of the present disclosure provide an audio playing control method performed by a first terminal device, wherein the first terminal device is configured to establish a Bluetooth connection with an audio output device, the audio output device is further configured to establish another Bluetooth connection with a second terminal device, and the method includes: transmitting a first piece of audio data to the audio output device, wherein when the audio output device receives a second piece of audio data transmitted from the second terminal device, the first piece of audio data is configured to enable the audio output device to determine a target piece of audio data from the first piece of audio data and the second piece of audio data, play the target piece of audio data, and perform a first processing operation corresponding to a non-target piece of audio data to prevent the audio output device from outputting the non-target piece of audio data, wherein the non-target piece of audio data is another piece of audio data of the first piece of audio data and the second piece of audio data other than the target piece of audio data.

In a third aspect, some embodiments of the present disclosure provide an audio output device including a memory and a processor, wherein the audio output device is configured to establish a Bluetooth connection with each of a first terminal device and a second terminal device, a computer program is stored in the memory, and when being executed by the processor, the computer program causes the processor to execute receiving a second piece of audio data transmitted from the second terminal device to the audio output device when the first terminal device transmits a first piece of audio data to the audio output device; determining a target piece of audio data from the first piece of audio data and the second piece of audio data; and playing the target piece of audio data and performing a first processing operation corresponding to a non-target piece of audio data to prevent the audio output device from outputting the non-target piece of audio data, wherein the non-target piece of audio data is another piece of audio data of the first piece of audio data and the second piece of audio data other than the target piece of audio data.

The details of one or more embodiments of the present disclosure are presented in the drawings and description below. Other features and beneficial effects of the present disclosure will be reflected in the specification, drawings, and claims.

BRIEF DESCRIPTION OF THE DRAWINGS

In order to explain technical solutions of embodiments of the present disclosure more clearly, the following will briefly introduce drawings needed to use in the description of the embodiments. Obviously, the drawings in the following are only some embodiments of the present disclosure. For those skilled in the art, other drawings may also be obtained from these drawings without any creative works.

FIG. 1 is a schematic diagram of an application scenario of an audio playing control method according to some embodiments of the present disclosure.

FIG. 2 is a schematic flowchart of an audio playing control method according to some embodiments of the present disclosure.

FIG. 5 is a schematic flowchart of putting a non-target piece of audio data on mute according to some embodiments of the present disclosure.

FIG. 6 is a schematic flowchart of an audio playing control method according to some embodiments of the present disclosure.

FIG. 8 is a schematic flowchart of an audio playing control method for a first terminal device according to some embodiments of the present disclosure.

FIG. 9 is a schematic flowchart of an audio playing control method for a second terminal device according to some embodiments of the present disclosure.

DETAILED DESCRIPTIONS

Figure 3:
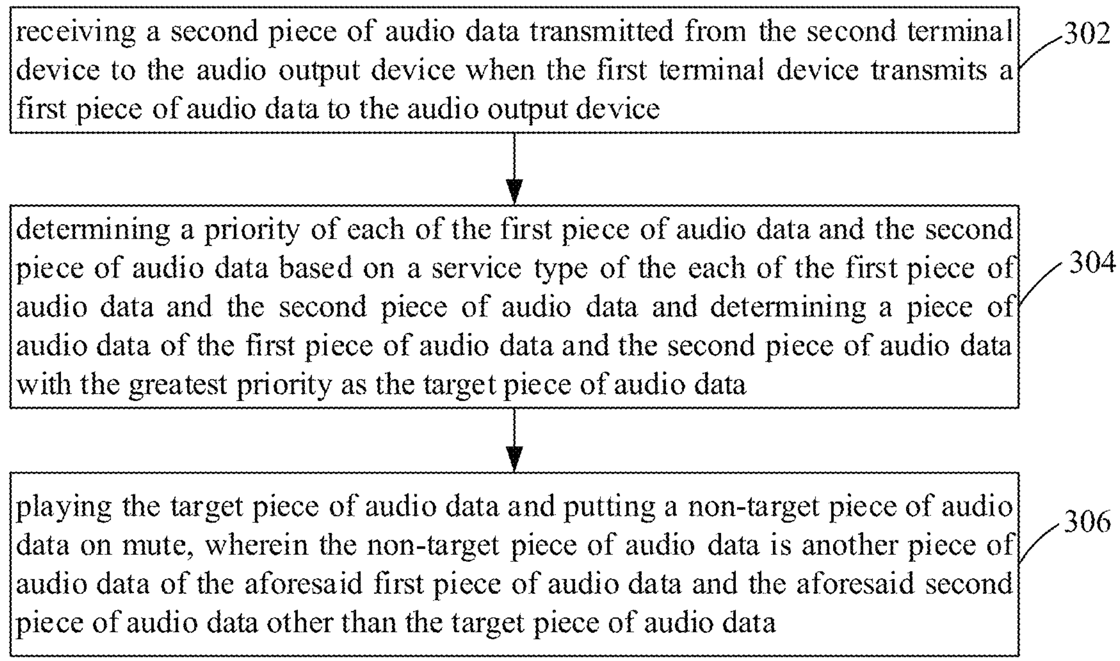
FIG. 3 is a schematic flowchart of an audio playing control method according to some embodiments of the present disclosure.

The technical solutions in embodiments of the present disclosure will be described below with reference to the drawings in the embodiments of the present disclosure. Obviously, the described embodiments are part of the embodiments of the present disclosure, but not all of the embodiments. With regard to the embodiments in the present disclosure, all other embodiments obtained by those skilled in the art without making any creative works belong to the protection scope of the present disclosure.

In the embodiments of the present disclosure, the terms "comprising", "including", "having", and any deformation thereof are intended to cover non-exclusive inclusion. For example, a process, a method, a system, a product or a device, that contains a series of operations or units, is not limited to the listed operations or units, but optionally includes unlisted operations or units, or optionally includes other operations or units that are inherent to the process, method, product or device.

Embodiments of the present disclosure disclose an audio playing control method, an audio playing control apparatus, an audio output device, and a storage medium, so as to improve the stability and reliability of establishing communication connections between an audio output device and terminal devices for outputting audio.

The following will be described in detail in combination with the drawings.

As illustrated in FIG. 1, FIG. 1 is a schematic diagram of an application scenario of an audio playing control method according to some embodiments of the present disclosure. As illustrated in FIG. 1, the application scenario may include a first terminal device 10, a second terminal device 20, and an audio output device 30. The audio output device 30 is configured to establish a Bluetooth connection with each of the first terminal device 10 and the second terminal device 20. Based on the aforesaid Bluetooth connection, the first terminal device 10 or the second terminal device 20 may transmit data with the audio output device 30 independently. In some embodiments, the aforesaid Bluetooth connection may be achieved based on a classic Bluetooth protocol (such as Bluetooth 4.0 or other versions developed by the Bluetooth Special Interest Group (SIG)) or a Bluetooth Low Energy (BLE) protocol (such as Bluetooth 5.0 or other versions), which is not specifically limited in the embodiments of the present disclosure.

For example, both the aforesaid first terminal device 10 and the aforesaid second terminal device 20 may include various devices or systems with the function of Bluetooth communication, such as mobile phones, smart wearable devices, vehicle-mounted terminals, tablets, Personal Computers (PCs), Personal Digital Assistants (PDAs), etc. The aforesaid audio output device 30 may include various devices (such as earphones, loudspeaker boxes, etc., especially True Wireless Stereo (TWS) earphones) those also have the function of Bluetooth communication and have an audio output module, such as a loudspeaker and so on. The first terminal device 10 and the second terminal device 20 illustrated in FIG. 1 are both mobile phones, and the audio output device 30 is an earphone. This is only an example and does not constitute a limitation on device types of the first terminal device 10, the second terminal device 20, and the audio output device 30 in the embodiments of the present disclosure.

In the embodiments of the present disclosure, after establishing a Bluetooth connection with each of the first terminal device 10 and the second terminal device 20, the audio output device 30 performing the audio playing control method may receive a second piece of audio data transmitted from the second terminal device 20 to the audio output device 30 when the first terminal device 10 transmits a first piece of audio data to the audio output device 30. On this basis, the audio output device 30 may determine a target piece of audio data from the aforesaid first piece of audio data and the aforesaid second piece of audio data, play the target piece of audio data, and perform a first processing operation corresponding to a non-target piece of audio data to prevent the audio output device 30 from outputting the non-target piece of audio data. Herein, the aforesaid non-target piece of audio data refers to another piece of audio data of the aforesaid first piece of audio data and the aforesaid second piece of audio data other than the target piece of audio data.

In some embodiments, the number of the aforesaid second terminal devices 20 may also be multiple, and the audio output device 30 may determine a unique target piece of audio data from the audio data transmitted by each of the first terminal device 10 and the multiple second terminal devices 20, so as to play the target piece of audio data. Other than the target piece of audio data, the audio data transmitted by each of the first terminal device 10 and the multiple second terminal devices 20 may be configured as the non-target piece of audio data. The audio output device 30 may perform a corresponding first processing operation on each non-target piece of audio data in parallel while playing the target piece of audio data. In this way, at this time, the audio output device 30 may only play the target piece of audio data and does not output each aforesaid non-target piece of audio data. When the number of the second terminal device 20 is one, the aforesaid audio playing control method is applicable to a scenario of "one to two", in which one audio output device establishes the Bluetooth connection with each of two terminal devices. When the number of the second terminal devices 20 is multiple, the above audio playing control method is applicable to a scenario of "one to multiple", in which one audio output device establishes the Bluetooth connection with each of the multiple terminal devices.

By performing the aforesaid method, when faces audio data from multiple terminal devices, i.e., when receiving the first piece of audio data transmitted by the first terminal device 10 and the second piece of audio data transmitted by the second terminal device 20, the audio output device 30 may perform different processing on the first piece of audio data and the second piece of audio data, so as to play the target piece of audio data of the first piece of audio data and the second piece of audio data. The non-target piece of audio data that is not identified as the target piece of audio data is not actually output by the audio output device without disconnecting the connection between a terminal device (which is one of the first terminal device 10 and the second terminal device 20) corresponding to or transmitting the non-target piece of audio data and the audio output device. By playing the target piece of audio data and performing the aforesaid first processing operation on the non-target piece of audio data, the audio output device 30 may always maintain the Bluetooth connection with each of the first terminal device 10 and the second terminal device 20. In the related art, when multiple terminal devices transmit audio data to the audio output device simultaneously, the audio output device is required to disconnect the Bluetooth connection with a non-target terminal device, so as to receive the piece of audio data transmitted by a target terminal device, such a complex processing may be avoided in the embodiments of the present disclosure. In this way, the audio output device 30 is not required to re-establish the Bluetooth connection with the disconnected non-target terminal device in a subsequent process, thereby reducing a possibility of difficulties or even failures in connection. In this way, the stability and reliability of connecting the audio output device 30 with the terminal devices for outputting audio may be improved.

As illustrated in FIG. 2, FIG. 2 is a schematic flowchart of an audio playing control method according to some embodiments of the present disclosure. The method may be performed by the aforesaid audio output device. The audio output device may establish a Bluetooth connection with each of the first terminal device and the second terminal device. As illustrated in FIG. 2, the audio playing control method may include the following operations.

At block 202, the method includes receiving a second piece of audio data transmitted from the second terminal device to the audio output device when the first terminal device transmits a first piece of audio data to the audio output device.

In some embodiments of the present disclosure, after establishing the Bluetooth connection with each of the first terminal device and the second terminal device, the audio output device may transmit data with the first terminal device or the second terminal device based on the Bluetooth connection independently. Exemplarily, taking the first terminal device as an example, when the audio output device is required to transmit data with the first terminal device, the data transmitting link established based on the Bluetooth connection between the first terminal device and the audio output device may be activated. In this way, the first terminal device may call the first piece of audio data stored in the first terminal device or obtained by the first terminal device and transmit the first piece of audio data to the audio output device through the aforesaid data transmitting link. In some embodiments, the audio output device may also package device information (such as product identification, remaining power, etc.) thereof, a communication status (such as a connection status, a communication channel, etc.) thereof, and transmit the packaged data to the first terminal device through the aforesaid data transmitting link.

When the first terminal device transmits the first piece of audio data to the audio output device, the audio output device may also receive the second piece of audio data transmitted thereto from the second terminal device. In order to transmit data between the audio output device and the second terminal device, the data transmitting link established based on the Bluetooth connection between the second terminal device and the audio output device may also be activated. In this way, each of the first terminal device and the second terminal device may transmit the audio data thereof to the audio output device independently based on the established data transmitting link with the audio output device. On this basis, after receiving the aforesaid second piece of audio data, the audio output device may determine the target piece of audio data that needs to be played by the audio output device in a subsequent operation based on differences between the first piece of audio data and the second piece of audio data. On the other hand, the audio output device may perform the corresponding first processing operation on the non-target piece of audio data that does not need to be played temporarily. In this way, the processing flow of each of the first piece of audio data and the second piece of audio data may be properly arranged without disconnecting the Bluetooth connection with any terminal device, and the stability of establishing communication connections between the audio output device and the terminal devices for outputting audio may be improved.

At block 204, the method includes determining a target piece of audio data from the aforesaid first piece of audio data and the aforesaid second piece of audio data.

In some embodiments of the present disclosure, the audio output device may determine the target piece of audio data to be played by the audio output device from the first piece of audio data and the second piece of audio data after receiving the aforesaid first piece of audio data and the aforesaid second piece of audio data. For example, the audio output device may sort the first piece of audio data and the second piece of audio data based on a preset sorting rule and determine the top ranked piece of audio data as the target piece of audio data, which is the piece of audio data that needs to be prioritized for playing of the aforesaid first piece of audio data and the aforesaid second piece of audio data. Herein, the aforesaid sorting rule may be set based on the characteristics contained in each of the first piece of audio data and the second piece of audio data (such as time information characteristics, frequency distribution characteristics, etc.) or the type of each of the first piece of audio data and the second piece of audio data (such as a service type, an application type, etc.).

In some embodiments, the audio output device may determine the target piece of audio data based on the time information corresponding to each of the aforesaid first piece of audio data and the aforesaid second piece of audio data. For example, the aforesaid time information may include a timestamp corresponding to each piece of audio data (such as the time transmitted by the terminal device, the time received by the audio output device, etc.), a duration of sustainable playing, etc. Taking the timestamp as an example, the audio output device may firstly obtain the timestamp corresponding to each of the first piece of audio data and the second piece of audio data when the each of the first piece of audio data and the second piece of audio data is transmitted by the corresponding terminal device, and then determine the target piece of audio data based on the timestamp. Based on different preset sorting rules, the target piece of audio data may be the piece of audio data that is transmitted earliest of the aforesaid first piece of audio data and the aforesaid second piece of audio data, the piece of audio data that is transmitted latest of the aforesaid first piece of audio data and the aforesaid second piece of audio data, or the piece of audio data that is transmitted within a specified time period, which is not limited in the embodiments of the present disclosure.

In some embodiments, the audio output device may also determine the target piece of audio data based on the service type of each of the aforesaid first piece of audio data and the aforesaid second piece of audio data. For example, both the aforesaid first piece of audio data and the aforesaid second piece of audio data may include audio data with different service types, such as call audio data (including an audio call, an audio portion in a video call, etc.), media audio data (including audio data in applications such as a multimedia application, a real-time chat application, etc.), etc. The audio output device may determine a piece of audio data with the top ranked service type from the first piece of audio data and the second piece of audio data based on the preset sorting rule for different service types as the target piece of audio data.

In some embodiments, the audio output device may also determine the target piece of audio data based on the priority of each of the aforesaid first piece of audio data and the aforesaid second piece of audio data. The aforesaid priority may be determined based on the corresponding time information, service type, etc., of each piece of audio data, or based on the priority label carried by each piece of audio data (such as a priority number, a priority code, etc.). After receiving the first piece of audio data and the second piece of audio data, the audio output device may obtain the priority of each piece of audio data by analyzing and determine the piece of audio data with the greatest priority as the target piece of audio data.

At block 206, the method includes playing the target piece of audio data and performing a first processing operation corresponding to a non-target piece of audio data to prevent the audio output device from outputting the non-target piece of audio data, wherein the non-target piece of audio data is another piece of audio data of the first piece of audio data and the second piece of audio data other than the target piece of audio data.

In some embodiments of the present disclosure, after determining the target piece of audio data from the first piece of audio data and the second piece of audio data, the audio output device may configure another piece of audio data other than the target piece of audio data as the non-target piece of audio data. On this basis, the audio output device may perform the appropriate first processing operation on the non-target piece of audio data while playing the target piece of audio data to prevent the audio output device from outputting the non-target piece of audio data. The interference on the playing of the target piece of audio data may be avoided without disconnecting the Bluetooth connection with the terminal device that transmits the non-target piece of audio data.

In some embodiments, the audio output device may only receive the non-target piece of audio data and do not perform corresponding playing processing on the non-target piece of audio data. After determining the target piece of audio data, the audio output device may perform subsequent processing (such as storing, decoding, analog-to-digital converting, etc.) on the received target piece of audio data, and finally achieve the playing of the target piece of audio data. For the non-target piece of audio data, the audio output device may do not perform the aforesaid processing (such as not storing, not decoding after storing, etc.) on the received non-target piece of audio data. In this way, the audio output device may play the target piece of audio data, and the non-target piece of audio data may be not actually output by the audio output device.

In some embodiments, the audio output device may do not receive the non-target piece of audio data until the playing of target piece of audio data is suspended (paused) or completed. For example, after determining the target piece of audio data, the audio output device may issue a suspending instruction to the terminal device that transmits the non-target piece of audio data. In this way, the terminal device may stop transmitting the non-target piece of audio data to the audio output device, and the non-target piece of audio data may not be actually output by the audio output device. When the audio output device suspends or completes the playing of the target piece of audio data, the audio output device may issue a recovery instruction to the aforesaid terminal device to recover the transmission of non-target piece of audio data to the audio output device. In some embodiments, the aforesaid suspending instruction may include a call processing instruction. The terminal device receiving the call processing instruction may suspend the transmission of the non-target piece of audio data to the audio output device and perform a second processing operation corresponding to the call service of the non-target terminal device (i.e., the terminal device transmitting the non-target piece of audio data), such as externally play the non-target piece of audio data through a loudspeaker arranged in the non-target terminal device, etc. In this way, the interference on the playing of target piece of audio data on the audio output device may be avoided without disconnecting the Bluetooth connection between the non-target terminal device and the audio output device, and the non-target piece of audio data may be played continually. The flexibility of outputting audio by the system including the audio output device and the terminal devices connected to audio output devices may be improved.

It may be seen that, by performing the audio playing control method described in the aforesaid embodiments, when receiving the first piece of audio data transmitted by the first terminal device and the second piece of audio data transmitted by the second terminal device, the audio output device may perform different processing on the aforesaid first piece of audio data and the aforesaid second piece of audio data, so as to play the target piece of audio data of the first piece of audio data and the second piece of audio data. The non-target piece of audio data that is not identified as the target piece of audio data is not actually output by the audio output device without disconnecting the connection between the terminal device corresponding to or transmitting the non-target piece of audio data and the audio output device. The audio playing control method may ensure that the audio output device always maintain the Bluetooth connection with each of the first terminal device and the second terminal device. A complex processing that the Bluetooth connection with the non-target terminal device is required to be disconnected when audio data from multiple terminal devices are received simultaneously, so as to receive the audio data transmitted by the target terminal device may be avoided. In this way, the audio output device does not need to re-establish the Bluetooth connection with the disconnected non-target terminal device in a subsequent process, thereby reducing a possibility of difficulties or even failures in connection. In this way, the stability and reliability of establishing communication connections between the audio output device and the terminal devices for outputting audio may be improved.

As illustrated in FIG. 3, FIG. 3 is a schematic flowchart of an audio playing control method according to some embodiments of the present disclosure. The method may be performed by the aforesaid audio output device. The audio output device may establish a Bluetooth connection with each of the first terminal device and the second terminal device. As illustrated in FIG. 3, the audio playing control method may include the following operations.

At block 302, the method includes receiving a second piece of audio data transmitted from the second terminal device to the audio output device when the first terminal device transmits a first piece of audio data to the audio output device.

Block 302 is similar to block 202 described above, and will not be repeated herein.

At block 304, the method includes determining a priority of each of the first piece of audio data and the second piece of audio data based on a service type of the each of the first piece of audio data and the second piece of audio data and determining a piece of audio data of the first piece of audio data and the second piece of audio data with the greatest priority as the target piece of audio data.

For example, the aforesaid service type may include a call service, a media service, etc. The call service may include an audio call, an audio portion in a video call, etc. The media service may include an audio outputting portion involves in applications such as a multimedia application (such as a music application, a video application, etc.), a real-time chat application (such as an audio chat application, a video chat application, etc.), other functional applications (such as a recorder, a navigation application, etc.), etc.

In some embodiments of the present disclosure, the audio output device may firstly determine the service type of each of the first piece of audio data and the second piece of audio data after receiving the aforesaid first piece of audio data and the aforesaid second piece of audio data, and then determine the priority of each of the first piece of audio data and the second piece of audio data based on a preset sorting rule for different service types. On this basis, based on a sorting of the priority of the first piece of audio data and the priority of the second piece of audio data, the audio output device may determine the piece of audio data with the greatest priority as the target piece of audio data.

For different service types, the aforesaid sorting rule may set different priorities for the pieces of audio data based on the importance of the service type. For the same service type, the aforesaid sorting rule may also set further subdivided priorities in combination with characteristics, such as the time information and so on, of the audio data. For example, the priority of the call service may be greater than the priority of the media service. For the call service, the priority of the call audio data accessed later may be greater than the priority of the call audio data accessed firstly. For the media service, the priority of the media audio data accessed firstly may be greater than the priority of the media audio data accessed later.

For example, if the service type of the aforesaid second piece of audio data is the call service, that is, the piece of audio data accessed later is the call audio data, regardless of whether the service type of the first piece of audio data is the call service (the priority of the call audio data accessed later is greater than the priority of the call audio data accessed firstly) or the media service (the priority of the call service is greater than the priority of the media service), the audio output device may determine that the priority of the second piece of audio data is greater than the priority of the first piece of audio data, thus determining the second piece of audio data as the target piece of audio data.

For example, if the service type of the aforesaid second piece of audio data is the media service, that is, the piece of audio data accessed later is the media audio data, regardless of whether the service type of the first piece of audio data is the call service (the priority of the call service is greater than the priority of the media service) or the media service (the priority of the media audio data accessed firstly is greater than the priority of the media audio data accessed later), the audio output device may determine that the priority of the first piece of audio data is greater than the priority of the second piece of audio data, thus determining the first piece of audio data as the target piece of audio data.

At block 306, the method includes playing the target piece of audio data and putting a non-target piece of audio data on mute, wherein the non-target piece of audio data is another piece of audio data of the aforesaid first piece of audio data and the aforesaid second piece of audio data other than the target piece of audio data.

In some embodiments of the present disclosure, after determining the target piece of audio data from the first piece of audio data and the second piece of audio data, the audio output device may configure another piece of audio data other than the target piece of audio data as the non-target piece of audio data. On this basis, the audio output device may continue to receive the non-target piece of audio data while playing the target piece of audio data, and put the non-target piece of audio data on mute. In this way, the interference on the playing of the target piece of audio data may be avoided.

Figure 4:
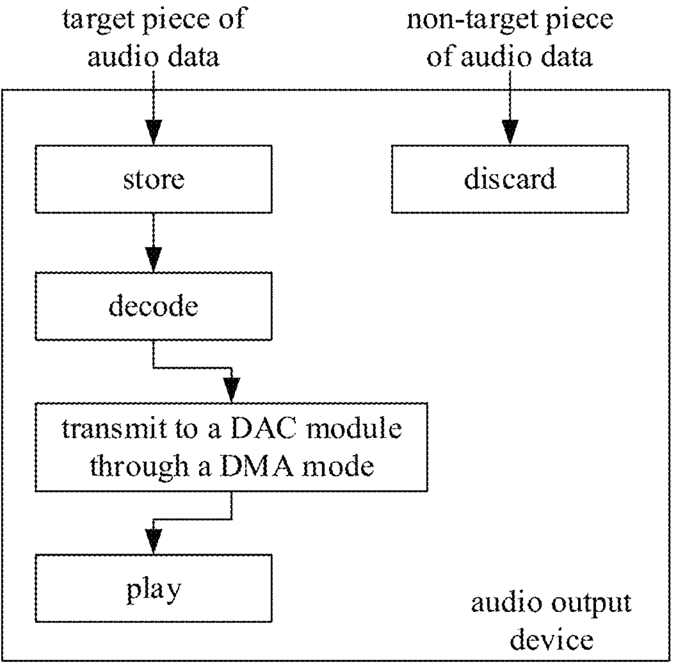
FIG. 4 is a schematic flowchart of putting a non-target piece of audio data on mute according to some embodiments of the present disclosure.

In some embodiments, the audio output device may do not perform corresponding playing processing on the non-target piece of audio data. For example, as illustrated in FIG. 4, after determining the target piece of audio data, the audio output device may store and decode the received target piece of audio data, then transmit the decoded target piece of audio data to a Digital to Analog Converter (DAC) module through a Direct Memory Access (DMA) mode for digital to analog conversion, and finally, the target audio signal that may be used for playing is obtained. For the non-target piece of audio data, the audio output device may do not perform the aforesaid processing on the received non-target piece of audio data, and directly discard the received non-target piece of audio data. In this way, the audio output device does not need to perform subsequent decoding and playing operations on the non-target piece of audio data.

In some embodiments, the audio output device may also set the volume corresponding to the non-target piece of audio data to be 0. In this way, even if the non-target piece of audio data is played, no actual output is generated. For example, as illustrated in FIG. 5, the audio output device may set the volume corresponding to the non-target piece of audio data to be 0 after determining the target piece of audio data, and mix the target piece of audio data with the non-target piece of audio data of which the volume is set to be 0 through a mixer to obtain mixed output data. On this basis, the audio output device may play the mixed output data, and the interference on the actual playing effect of the target piece of audio data may be avoided.

It may be seen that, by performing the audio playing control method described in the aforesaid embodiments, the audio output device may always maintain the Bluetooth connection with each of the first terminal device and the second terminal device. A complex processing that the Bluetooth connection with the non-target terminal device is required to be disconnected when audio data from multiple terminal devices are received simultaneously, so as to receive the audio data transmitted by the target terminal device may be avoided. In this way, the audio output device does not need to re-establish the Bluetooth connection with the disconnected non-target terminal device in a subsequent process, thereby reducing a possibility of difficulties or even failures in connection. In this way, the stability and reliability of establishing communication connections between the audio output device and the terminal devices for outputting audio may be improved. In addition, the corresponding sorting rule of priorities is set for different service types, the target audio device may be determined efficiently and orderly, in this way, the efficiency of outputting audio by the audio output device may be improved. In addition, by putting the non-target piece of audio data on mute, the interference on the playing of target piece of audio data may be avoided without disconnecting the Bluetooth connection with the terminal device corresponding to or transmitting the non-target piece of audio data. In this way, the reliability of establishing communication connections between the audio output device and the terminal devices and the flexibility of outputting audio may be improved.

As illustrated in FIG. 6, FIG. 6 is a schematic flowchart of an audio playing control method according to some embodiments of the present disclosure. The method may be performed by the aforesaid audio output device. The audio output device may establish a Bluetooth connection with each of the first terminal device and the second terminal device. As illustrated in FIG. 6, the audio playing control method may include the following operations.

At block 602, the method includes receiving a second piece of audio data transmitted from the second terminal device to the audio output device when the first terminal device transmits a first piece of audio data to the audio output device.

Block 602 is similar to block 202 described above, and will not be repeated herein.

At block 604, the method includes determining a priority of each of the first piece of audio data and the second piece of audio data based on a service type of the each of the first piece of audio data and the second piece of audio data and determining a piece of audio data of the first piece of audio data and the second piece of audio data with the greatest priority as the target piece of audio data.

Block 604 is similar to block 304 described above, and will not be repeated herein.

At block 606, the method includes playing the target piece of audio data in response to a service type corresponding to a non-target piece of audio data being a call service, and transmitting a call processing instruction to a non-target terminal device, wherein the non-target piece of audio data is another piece of audio data of the aforesaid first piece of audio data and the aforesaid second piece of audio data other than the target piece of audio data, the non-target terminal device is a terminal device of the first terminal device and the second terminal device that transmits the non-target piece of audio data to the audio output device, the call processing instruction is configured to trigger the non-target terminal device to stop transmitting the non-target piece of audio data to the audio output device and perform a second processing operation corresponding to the call service of the non-target terminal device.

In some embodiments of the present disclosure, if the service type corresponding to the non-target piece of audio data is the call service, while ensuring that the playing of the target piece of audio data on the audio output device is not interfered, in order to prevent a user from missing the call content corresponding to the non-target piece of audio data, the non-target piece of audio data may be played by the terminal device that originally transmits the non-target piece of audio data.

For example, after determining the target piece of audio data from the first piece of audio data and the second piece of audio data, the audio output device may configure another piece of audio data other than the target piece of audio data as the non-target piece of audio data, and may transmit the call processing instruction to the non-target terminal device that originally transmits the non-target piece of audio data while playing the target piece of audio data. Herein, the call processing instruction may include a call loudspeaker instruction. After receiving the call loudspeaker instruction, the non-target terminal device may respond to the call loudspeaker instruction, that is, when being triggered by the call loudspeaker instruction, the non-target terminal device may stop transmitting the aforesaid non-target piece of audio data to the audio output device, and play the non-target piece of audio data through the loudspeaker of the non-target terminal device. In some embodiments, when playing the non-target piece of audio data, the non-target terminal device may play the non-target piece of audio data in a form of receiver output through a top microphone, or in a form of loudspeaker output through a bottom microphone, which is not limited in the embodiments of the present disclosure. In some embodiments, the non-target terminal device may also set the volume corresponding to the aforesaid non-target piece of audio data to be 0, respond to the call loudspeaker instruction, and externally play the non-target piece of audio data of which the volume is set to be 0 through the loudspeaker. In this way, the interference on the playing of the target piece of audio data may be completely avoided.

In some embodiments, in addition to the operation of externally playing the non-target piece of audio data through the loudspeaker, the second processing operation corresponding to the call service of the non-target terminal device that may be performed by the non-target terminal device further includes temporarily suspending the call service. For example, the aforesaid call processing instruction may include a call suspending instruction. After receiving the call suspending instruction, the non-target terminal device may respond to the call suspending instruction, that is, when being triggered by the call suspending instruction, the non-target terminal device may stop transmitting the aforesaid non-target piece of audio data to the audio output device and issue a suspending prompt to a call object corresponding to the non-target terminal device (such as another terminal device connected to the non-target terminal device for communication). On this basis, the non-target terminal device may set the call service thereof to be a suspending state, so as to temporarily not output the non-target piece of audio data. In this way, the interference on the playing of the target piece of audio data may be completely avoided.

In some embodiments, after determining the target piece of audio data, if the service types corresponding to the target piece of audio data and non-target piece of audio data are both call services, the audio output device may output an answering prompt information. For example, the answering prompt information may include an answering prompt sound. The answering prompt sound is configured to prompt the user to answer the target piece of audio data by performing a certain operation, such as "phone A calls, double-click to answer", "phone B calls, nod to answer", etc. The answering prompt sound may also include answering prompt sound effect, such as different bells or prompt sounds set in advance on the terminal device.

On this basis, the audio output device may detect a first call answering operation of the user on the audio output device. When detecting the first call answering operation (an operation corresponding to the answering prompt sound, such as "double clicking", "nodding", etc.) corresponding to the aforesaid answering prompt information, the audio output device may respond to a first switch instruction corresponding to the first call answering operation, play the target piece of audio data, and transmit the aforesaid call loudspeaker instruction to the non-target terminal device simultaneously. In this way, the non-target terminal device may play the aforesaid non-target piece of audio data through the loudspeaker thereof while the audio output device plays the aforementioned target piece of audio data. It may be avoided that the user misses the call content corresponding to the non-target piece of audio data.

On this basis, the audio output device may also switch to play the target piece of audio data or the non-target piece of audio data at any time. For example, whenever detecting a call switch operation thereon, the audio output device may respond to a second switch instruction corresponding to the call switch operation and switch to play the target piece of audio data or the non-target piece of audio data in turn. For example, if the call switch operation preset by the audio output device is double clicking (taking an earphone as an example, such as double clicking on the specified touch position on the earphone), when detecting the specified double clicking operation, the audio output device may switch the target piece of audio data played currently to the non-target piece of audio data. When detecting double clicking again, the audio output device may switch the non-target piece of audio data played currently back to the target piece of audio data, and the aforesaid switch may be performed in turn. Whenever switching the piece of audio data played thereon, the audio output device may transmit the aforesaid call processing instruction to the terminal device corresponding to or transmitting the piece of audio data played before the switch. In this way, the terminal device may play the piece of audio data originally played seamlessly when the audio output device switches the played audio data, the loss of the call content may be avoided, and the reliability of outputting audio by the audio output device and the terminal devices may be improved.

At block 608, the method includes responding to a third switch instruction, stopping playing the target piece of audio data based on the third switch instruction, and playing the aforesaid non-target piece of audio data.

In some embodiments of the present disclosure, when being required to suspend or having already completed the playing of the target piece of audio data, the audio output device may respond to the third switch instruction, stop playing the target piece of audio data, and switch to play the non-target piece of audio data.

Figure 7:
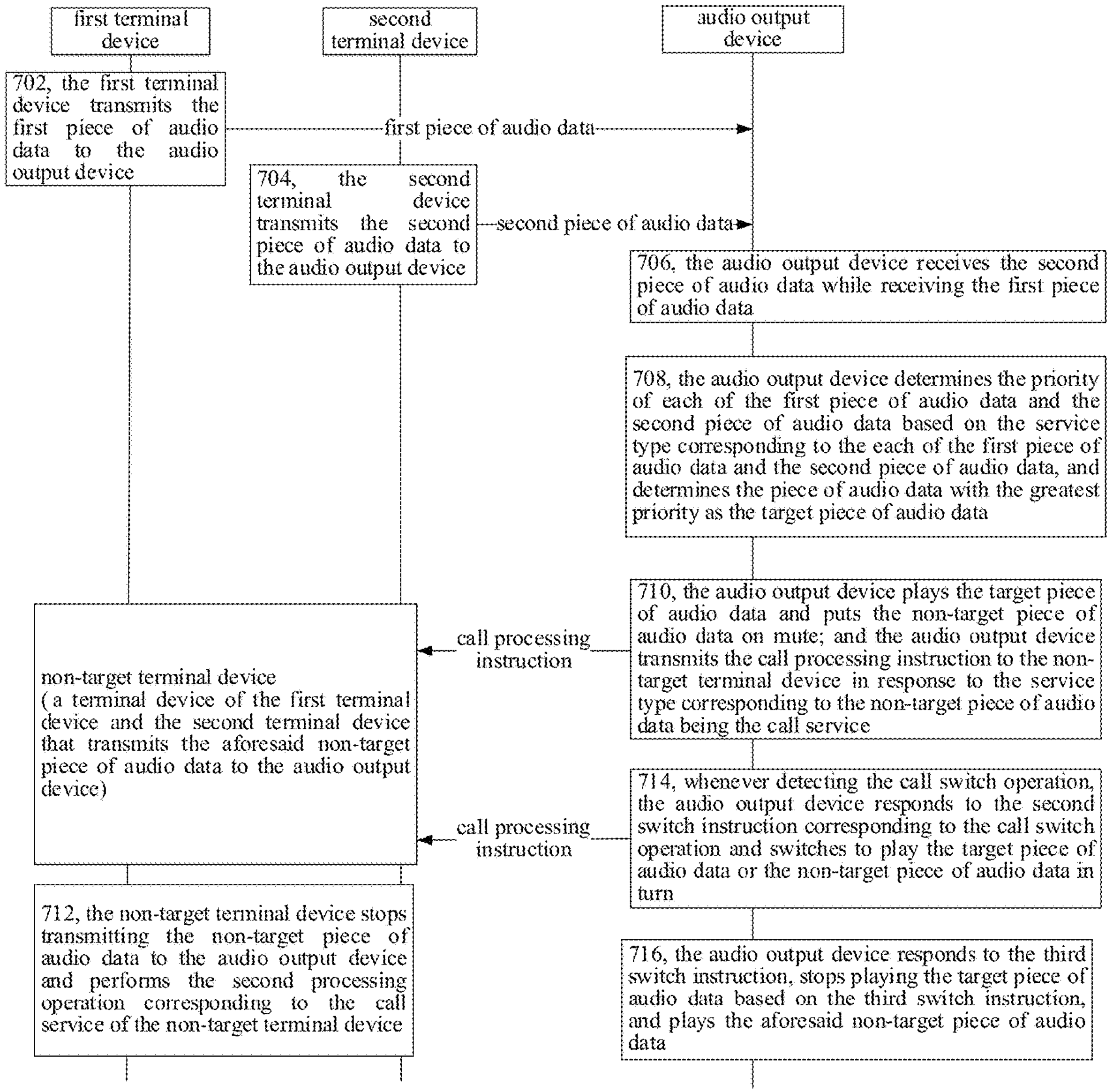
FIG. 7 is a timing diagram of an audio playing control method according to some embodiments of the present disclosure.

As illustrated in FIG. 7, FIG. 7 is a timing diagram of an audio playing control method according to some embodiments of the present disclosure. The method may be performed by a multi-device interaction system including the aforesaid audio output device, the aforesaid first terminal device, and the aforesaid second terminal device. The audio output device may establish a Bluetooth connection with each of the first terminal device and the second terminal device. As illustrated in FIG. 7, the audio playing control method may include the following operations.

At block 702, the first terminal device transmits the first piece of audio data to the audio output device.

At block 704, the second terminal device transmits the second piece of audio data to the audio output device.

At block 706, the audio output device receives the second piece of audio data while receiving the first piece of audio data.

At block 708, the audio output device determines the priority of each of the first piece of audio data and the second piece of audio data based on the service type corresponding to the each of the first piece of audio data and the second piece of audio data, and determines the piece of audio data with the greatest priority as the target piece of audio data.

At block 710, the audio output device plays the target piece of audio data and puts the non-target piece of audio data on mute; and the audio output device transmits the call processing instruction to the non-target terminal device in response to the service type corresponding to the non-target piece of audio data being the call service.

If the service type corresponding to the non-target piece of audio data and the service type corresponding to the target piece of audio data are both call services, the audio output device may firstly output the answering prompt information. When detecting the first call answering operation corresponding to the answering prompt information, the audio output device may execute the operation of playing the target piece of audio data and transmitting the call processing instruction to the non-target terminal device of aforesaid block 710. Herein, the non-target terminal device is a terminal device of the first terminal device and the second terminal device that transmits the aforesaid non-target piece of audio data to the audio output device.

At block 712, the non-target terminal device stops transmitting the non-target piece of audio data to the audio output device and performs the second processing operation corresponding to the call service of the non-target terminal device.

Operations at block 712 and the subsequent block 714 are only executed when the service type corresponding to the non-target piece of audio data is the call service. If the service type corresponding to the non-target piece of audio data is the media service, operations at block 712 and block 714 may be omitted.

At block 714, whenever detecting the call switch operation, the audio output device responds to the second switch instruction corresponding to the call switch operation and switches to play the target piece of audio data or the non-target piece of audio data in turn.

Whenever switching the piece of audio data played thereon, the audio output device may transmit the aforesaid call processing instruction to the terminal device corresponding to the piece of audio data played before the switch. In this way, the terminal device (that is, the non-target terminal device, the non-target terminal device at this time is a terminal device of the first terminal device and the second terminal device that transmits the piece of audio data which is not played currently to the audio output device) may play the piece of audio data originally played seamlessly when the audio output device switches the played audio data, the loss of the call content may be avoided, and the reliability of outputting audio by the audio output device and the terminal devices may be improved.

At block 716, the audio output device responds to the third switch instruction, stops playing the target piece of audio data based on the third switch instruction, and plays the aforesaid non-target piece of audio data.

If the audio output device plays the non-target piece of audio data currently, the audio output device may also respond to the third switch instruction, stop playing the non-target piece of audio data based on the third switch instruction, and play the aforesaid target piece of audio data.

If the audio output device does not receive another piece of audio data transmitted by another terminal device other than the piece of audio data played currently, the audio output device may enter an idle state after responding to the third switch instruction and stopping playing the current piece of audio data until the piece of audio data to be played is received again.

It may be seen that, by performing the audio playing control method described in the aforesaid embodiments, the audio output device may always maintain the Bluetooth connection with each of the first terminal device and the second terminal device. A complex processing that the Bluetooth connection with the non-target terminal device is required to be disconnected when audio data from multiple terminal devices are received simultaneously, so as to receive the audio data transmitted by the target terminal device may be avoided. In this way, the audio output device does not need to re-establish the Bluetooth connection with the disconnected non-target terminal device in a subsequent process, thereby reducing a possibility of difficulties or even failures in connection. In this way, the stability and reliability of establishing communication connections between the audio output device and the terminal devices for outputting audio may be improved. In addition, by playing the non-target piece of audio data on the terminal device that transmits the non-target piece of audio data, not only the interference on the playing of the target piece of audio data on the audio output device may be avoided, but also it may be avoided that the user misses the call content corresponding to the non-target piece of audio data. The target piece of audio data and the non-target piece of audio data may be switched to be played at any time, and the flexibility of using the audio output device by the user may be improved.

As illustrated in FIG. 8, FIG. 8 is a schematic flowchart of an audio playing control method for a first terminal device according to some embodiments of the present disclosure. The method may be performed by the aforesaid first terminal device. The first terminal device may establish a Bluetooth connection with the aforesaid audio output device, and the audio output device may further establish a Bluetooth connection with the second terminal device. As illustrated in FIG. 8, the audio playing control method may include the following operations.

At block 802, the method includes transmitting a first piece of audio data to the audio output device, wherein when the audio output device receives a second piece of audio data transmitted from the second terminal device, the first piece of audio data is configured to enable the audio output device to determine a target piece of audio data from the first piece of audio data and the second piece of audio data, play the target piece of audio data, and perform a first processing operation corresponding to a non-target piece of audio data to prevent the audio output device from outputting the non-target piece of audio data, wherein the non-target piece of audio data is another piece of audio data of the first piece of audio data and the second piece of audio data other than the target piece of audio data.

In some embodiments, if a service type corresponding to the first piece of audio data is a call service, when receiving the call processing instruction transmitted by the audio output device, the first terminal device may respond to a call processing instruction, stop transmitting the first piece of audio data to the audio output device, and perform a second processing operation corresponding to the call service of the first terminal device.

In some embodiments, the aforesaid call processing instruction may include a call loudspeaker instruction. The aforesaid second processing operation may include responding to the call loudspeaker instruction by the first terminal device and externally playing the first piece of audio data through a loudspeaker of the first terminal device. In some embodiments, the first terminal device may also set the volume corresponding to the first piece of audio data to be 0 firstly, respond to the aforesaid call loudspeaker instruction, and externally play the first piece of audio data of which the volume is set to be 0 through the loudspeaker thereof. In this way, the interference on the playing of the target piece of audio data may be completely avoided.

In some embodiments, the aforesaid call processing instruction may include a call suspending instruction. The aforesaid second processing operation may include responding to the call suspending instruction by the first terminal device, transmitting a suspending prompt sound to a call object of the first terminal device by the first terminal device, and setting the call service of the first terminal device to be a suspending state, so as to temporarily not output the non-target piece of audio data. In this way, the interference on the playing of the target piece of audio data may be completely avoided.

By performing the aforesaid method, not only the interference on the playing of the target piece of audio data on the audio output device may be avoided, but also it may be avoided that the user misses the call content corresponding to the non-target piece of audio data. In this way, the using experience of the user may be improved.

As illustrated in FIG. 9. FIG. 9 is a schematic flowchart of an audio playing control method for a second terminal device according to some embodiments of the present disclosure. The method may be performed by the aforesaid second terminal device. The second terminal device may establish a Bluetooth connection with the aforesaid audio output device, and the audio output device may further establish a Bluetooth connection with the first terminal device. As illustrated in FIG. 9, the audio playing control method may include the following operations.

At block 902, the method includes transmitting a second piece of audio data to the audio output device, wherein when the first terminal device transmits a first piece of audio data to the audio output device, the second piece of audio data is configured to enable the audio output device to determine a target piece of audio data from the first piece of audio data and the second piece of audio data, play the target piece of audio data, and perform a first processing operation corresponding to a non-target piece of audio data to prevent the audio output device from outputting the non-target piece of audio data, wherein the non-target piece of audio data is another piece of audio data of the first piece of audio data and the second piece of audio data other than the target piece of audio data.

In some embodiments, when detecting a second call answering operation thereon, the second terminal device may respond to the second call answering operation and transmit the second piece of audio data corresponding to the call content answered by the second terminal device to the audio output device. For example, the aforesaid second call answering operation may include a touch operation, a moving operation, etc., on the second terminal device when the user answers the aforesaid call content. By performing the aforesaid method, the user may choose to answer a call on the audio output device or the terminal device flexibly, and the flexibility of outputting audio by the audio output device and the terminal devices may be improved.

Figure 10:
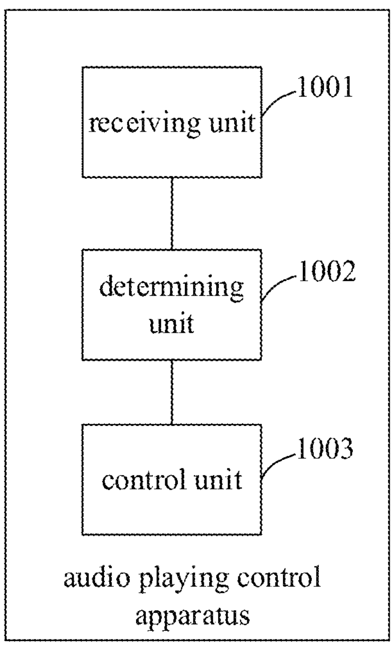
FIG. 10 is a schematic modularized diagram of an audio playing control apparatus according to some embodiments of the present disclosure.

As illustrated in FIG. 10, FIG. 10 is a schematic modularized diagram of an audio playing control apparatus according to some embodiments of the present disclosure. The audio playing control apparatus may be used for the aforesaid audio output device. The audio output device is configured to establish a Bluetooth connection with each of a first terminal device and a second terminal device. As illustrated in FIG. 10, the audio playing control apparatus may include a receiving unit 1001, a determining unit 1002, and a control unit 1003.

The receiving unit 1001 is configured to receive a second piece of audio data transmitted from the second terminal device to the audio output device when the first terminal device transmits a first piece of audio data to the audio output device.

The determining unit 1002 is configured to determine a target piece of audio data from the first piece of audio data and the second piece of audio data.

The control unit 1003 is configured to play the target piece of audio data and perform a first processing operation corresponding to a non-target piece of audio data to prevent the audio output device from outputting the non-target piece of audio data, wherein the non-target piece of audio data is another piece of audio data of the first piece of audio data and the second piece of audio data other than the target piece of audio data.

It may be seen that, by performing the audio playing control method described in the aforesaid embodiments, when receiving the first piece of audio data transmitted by the first terminal device and the second piece of audio data transmitted by the second terminal device, the audio output device may perform different processing on the aforesaid first piece of audio data and the aforesaid second piece of audio data, so as to play the target piece of audio data of the first piece of audio data and the second piece of audio data. The non-target piece of audio data that is not identified as the target piece of audio data is not actually output by the audio output device without disconnecting the connection between the terminal device corresponding to or transmitting the non-target piece of audio data and the audio output device. The audio playing control method may ensure that the audio output device always maintain the Bluetooth connection with each of the first terminal device and the second terminal device. A complex processing that the Bluetooth connection with the non-target terminal device is required to be disconnected when audio data from multiple terminal devices are received simultaneously, so as to receive the audio data transmitted by the target terminal device may be avoided. In this way, the audio output device does not need to re-establish the Bluetooth connection with the disconnected non-target terminal device in a subsequent process, thereby reducing a possibility of difficulties or even failures in connection. In this way, the stability and reliability of establishing communication connections between the audio output device and the terminal devices for outputting audio may be improved.

In some embodiments, the aforesaid determining unit 1002 may be specifically configured to determine a priority of each of the first piece of audio data and the second piece of audio data based on a service type of the each of the first piece of audio data and the second piece of audio data and determine a piece of audio data of the first piece of audio data and the second piece of audio data with the greatest priority as the target piece of audio data.

For example, the aforesaid service type may include a call service and a media service. In response to the service type corresponding to the second piece of audio data being the call service, the aforesaid determining unit 1002 may determine that the priority of the second piece of audio data is greater than the priority of the first piece of audio data and determine the second piece of audio data as the target piece of audio data.

In response to the service type corresponding to the second piece of audio data being the media service, the aforesaid determining unit 1002 may determine that the priority of the first piece of audio data is greater than the priority of the second piece of audio data and determine the first piece of audio data as the target piece of audio data.

By using the audio playing control apparatus described in the aforesaid embodiments, the audio output device may set a corresponding sorting rule of priorities for different service types. The target audio device may be determined efficiently and orderly. In this way, the efficiency of outputting audio by the audio output device may be improved.

In one embodiment, the aforesaid control unit 1003 may be specifically configured to play the target piece of audio data and put the non-target piece of audio data on mute.

In some embodiments, when putting the non-target piece of audio data on mute, the control unit 1003 may discard the received non-target piece of audio data to prevent the audio output device from decoding and playing the non-target piece of audio data.

In some embodiments, when putting the non-target piece of audio data on mute, the control unit 1003 may set a volume corresponding to the non-target piece of audio data to be 0, and mix the target piece of audio data with the non-target piece of audio data of which the volume is set to be 0 to obtain a mixed output data. Furthermore, the control unit 1003 may play the mixed output data.

By using the audio playing control apparatus described in the aforesaid embodiments, the interference on the playing of target piece of audio data may be avoided without disconnecting the Bluetooth connection with the terminal device corresponding to or transmitting the non-target piece of audio data by putting the non-target piece of audio data on mute. In this way, the reliability of establishing communication connections between the audio output device and the terminal devices and the flexibility of outputting audio may be improved.

In some embodiments, if the service type corresponding to the non-target piece of audio data is the call service, the aforesaid control unit 1003 may be specifically configured to play the target piece of audio data and transmit a call processing instruction to a non-target terminal device, wherein the non-target terminal device is a terminal device of the first terminal device and the second terminal device that transmits the non-target piece of audio data to the audio output device, the call processing instruction is configured to trigger the non-target terminal device to stop transmitting the non-target piece of audio data to the audio output device and perform a second processing operation corresponding to the call service of the non-target terminal device.

In some embodiments, if each of the service type corresponding to the non-target piece of audio data and the service type corresponding to the target piece of audio data being the call service, the aforesaid control unit 1003 may output an answering prompt information. On this basis, the control unit 1003 may respond to a first switch instruction corresponding to a first call answering operation and play the target piece of audio data in response to the first call answering operation corresponding to the answering prompt information being detected.

In some embodiments, whenever a call switch operation on the audio output device is detected, the control unit 1003 may also respond to a second switch instruction corresponding to the call switch operation and switch to play the target piece of audio data or the non-target piece of audio data in turn.

In some embodiments, the aforesaid call processing instruction may include a call loudspeaker instruction. The aforesaid control unit 1003 may specifically be configured to transmit the call loudspeaker instruction to the non-target terminal device, wherein the second processing operation performed by the non-target terminal device in response to the non-target terminal device being triggered by the call loudspeaker instruction may include externally playing the non-target piece of audio data through a loudspeaker.

In some embodiments, the aforesaid call processing instruction may include a call suspending instruction. The aforesaid control unit 1003 may specifically be configured to transmit the call suspending instruction to the non-target terminal device, wherein the second processing operation performed by the non-target terminal device in response to the non-target terminal device being triggered by the call suspending instruction includes transmitting a suspending prompt sound to a call object corresponding to the non-target terminal device and setting the call service of the non-target terminal device to be a suspending state.

In some embodiments, after playing the target piece of audio data and performing a first processing operation corresponding to a non-target piece of audio data, the aforesaid control unit 1003 may further respond to a third switch instruction, stop playing the target piece of audio data based on the third switch instruction, and play the non-target piece of audio data.

It may be seen that, by using the audio playing control apparatus described in the aforesaid embodiments, by playing the non-target piece of audio data on the terminal device that transmits the non-target piece of audio data, not only the interference on the playing of the target piece of audio data on the audio output device may be avoided, but also it may be avoided that the user misses the call content corresponding to the non-target piece of audio data. The target piece of audio data and the non-target piece of audio data may be switched to be played at any time, and the flexibility of using the audio output device by the user may be improved.

Figure 11:
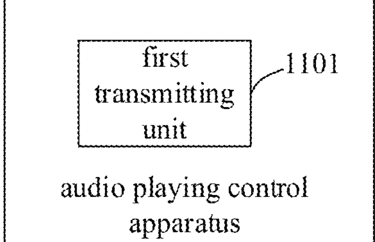
FIG. 11 is a schematic modularized diagram of an audio playing control apparatus according to some embodiments of the present disclosure.

As illustrated in FIG. 11, FIG. 11 is a schematic modularized diagram of an audio playing control apparatus according to some embodiments of the present disclosure. The audio playing control apparatus may be used for the aforesaid first terminal device. The first terminal device is configured to establish a Bluetooth connection with an audio output device, and the audio output device is further configured to establish another Bluetooth connection with a second terminal device. As illustrated in FIG. 11, the audio playing control apparatus may include a first transmitting unit 1101.

The first transmitting unit 1101 is configured to transmit a first piece of audio data to the audio output device, wherein when the audio output device receives a second piece of audio data transmitted from the second terminal device, the first piece of audio data is configured to enable the audio output device to determine a target piece of audio data from the first piece of audio data and the second piece of audio data, play the target piece of audio data, and perform a first processing operation corresponding to a non-target piece of audio data to prevent the audio output device from outputting the non-target piece of audio data, wherein the non-target piece of audio data is another piece of audio data of the first piece of audio data and the second piece of audio data other than the target piece of audio data.

In some embodiments, the aforesaid audio playing control apparatus may also include a processing operation unit not illustrated in the drawings. In case that a service type corresponding to the first piece of audio data is a call service, the processing operation unit is configured to respond to a call processing instruction, stop transmitting the first piece of audio data to the audio output device, and perform a second processing operation corresponding to the call service of the first terminal device in response to the call processing instruction transmitted by the audio output device being received.

In some embodiments, the aforesaid call processing instruction may include a call loudspeaker instruction. The aforesaid processing operation unit may be specifically configured to respond to the call loudspeaker instruction and externally play the first piece of audio data through a loudspeaker.

In some embodiments, the processing operation unit may also set the volume corresponding to the first piece of audio data to be 0 firstly, respond to the call loudspeaker instruction, and externally play the first piece of audio data of which the volume is set to be 0 through the loudspeaker. In this way, the interference on the playing of the target piece of audio data may be completely avoided.

In some embodiments, the aforesaid call processing instruction may include a call suspending instruction. The aforesaid processing operation unit may be specifically configured to respond to the call suspending instruction, transmit a suspending prompt sound to a call object of the first terminal device, and set the call service of the first terminal device to be a suspending state, so as to temporarily not output the non-target piece of audio data. In this way, the interference on the playing of the target piece of audio data may be completely avoided.

By using the audio playing control apparatus described in the aforesaid embodiments, not only the interference on the playing of the target piece of audio data on the audio output device may be avoided, but also it may be avoided that the user misses the call content corresponding to the non-target piece of audio data. In this way, the using experience of the user may be improved.

Figure 12:
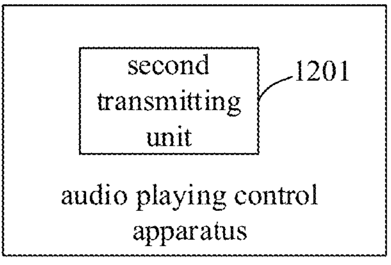
FIG. 12 is a schematic modularized diagram of an audio playing control apparatus according to some embodiments of the present disclosure.

As illustrated in FIG. 12, FIG. 12 is a schematic modularized diagram of an audio playing control apparatus according to some embodiments of the present disclosure. The audio playing control apparatus may be applied to the aforesaid second terminal device. The second terminal device is configured to establish a Bluetooth connection with an audio output device, and the audio output device is further configured to establish another Bluetooth connection with a first terminal device. As illustrated in FIG. 12, the audio playing control apparatus may include a second transmitting unit 1201.

The second transmitting unit 1201 is configured to transmit a second piece of audio data to the audio output device, wherein when the first terminal device transmits a first piece of audio data to the audio output device, the second piece of audio data is configured to enable the audio output device to determine a target piece of audio data from the first piece of audio data and the second piece of audio data, play the target piece of audio data, and perform a first processing operation corresponding to a non-target piece of audio data to prevent the audio output device from outputting the non-target piece of audio data, wherein the non-target piece of audio data is another piece of audio data of the first piece of audio data and the second piece of audio data other than the target piece of audio data.

In some embodiments, when transmitting the second piece of audio data to the audio output device, the second transmitting unit 1201 may specifically respond to a second call answering operation and transmitting the second piece of audio data to the audio output device in response to the second call answering operation on the second terminal device being detected. For example, the aforesaid second call answering operation may include a touch operation, a moving operation, etc., on the second terminal device when the user answers the aforesaid call content. By performing the aforesaid method, the user may choose to answer a call on the audio output device or the terminal device flexibly, and the flexibility of outputting audio by the audio output device and the terminal devices may be improved.

Figure 13:
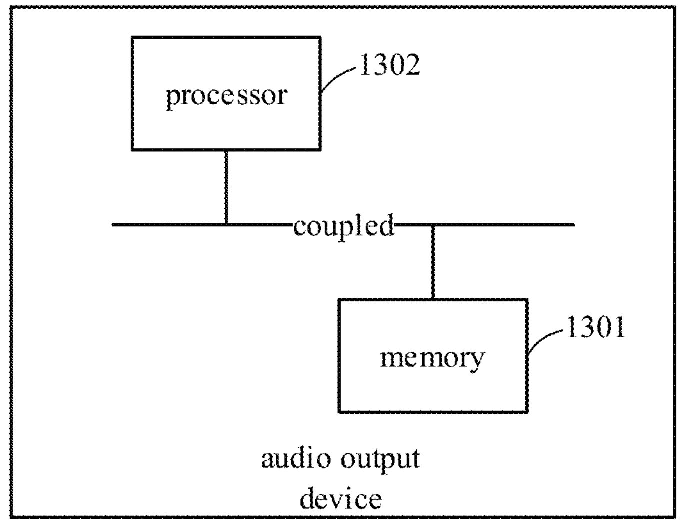
FIG. 13 is a schematic modularized diagram of an audio output device according to some embodiments of the present disclosure.

As illustrated in FIG. 13, FIG. 13 is a schematic modularized diagram of an audio output device according to some embodiments of the present disclosure. As illustrated in FIG. 13, the audio output device may include: a memory 1301, storing an executable program code; and a processor 1302, coupled to the memory 1301; wherein the processor 1302 calls the executable program code stored in memory 1301 and executes all or part of the operations of any one of the audio playing control methods described in the aforesaid embodiments for the audio output device.

Figure 14:
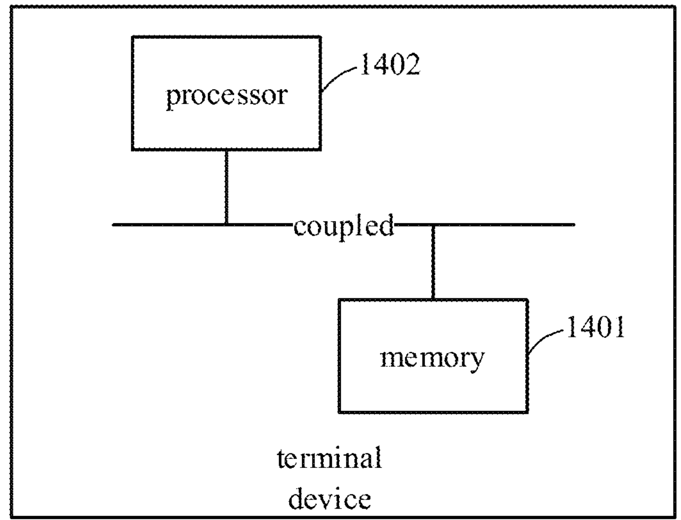
FIG. 14 is a schematic modularized diagram of a terminal device according to some embodiments of the present disclosure.

As illustrated in FIG. 14, FIG. 14 is a schematic modularized diagram of a terminal device according to some embodiments of the present disclosure. The terminal device may be the aforesaid first terminal device or the aforesaid second terminal device. As illustrated in FIG. 14, the terminal device may include: a memory 1401, storing an executable program code; and a processor 1402, coupled to the memory 1401; wherein the processor 1402 calls the executable program code stored in memory 1401 and executes all or part of the operations of any one of the audio playing control methods described in the aforesaid embodiments for the audio output device.

In addition, some embodiments of the present disclosure further disclose a computer-readable storage medium that stores a computer program for electronic data exchange. The computer program is configured to enable a computer to execute all or part of the operations of any one of the audio playing control methods described in the aforesaid embodiments for the audio output device, the first terminal device, and the second terminal device.

In addition, some embodiments of the present disclosure further disclose a computer program product. when running on a computer, the computer program product is configured to enable the computer to perform all or part of the operations in any one of the audio playing control methods described in the aforesaid embodiments.

Those skilled in the art may understand that all or part of the operations in the various methods of the aforesaid embodiments may be completed by instructing a relevant hardware through a program. The program may be stored in a computer-readable storage medium, including Read-Only Memory (ROM), Random Access Memory (RAM), Programmable Read-Only Memory (PROM), Erasable Programmable Read-Only Memory (EPROM), One-time Programmable Read-Only Memory (OTPROM), Electrically Erasable Programmable Read-Only Memory (EEPROM), Compact Disc Read-Only Memory (CD-ROM), or other optical disc memory, disk storage, magnetic tape memory, or any other computer-readable medium that may be configured to carry or store data.

The above provides a detailed description to an audio playing control method, an audio playing control apparatus, an audio output device, and a storage medium disclosed by the embodiments of the present disclosure. Specific examples are applied in the description to explain the principles and implementation methods of the present disclosure. The aforesaid embodiments are only used to help understand the methods and core ideas of the present disclosure. Meanwhile, for those skilled in the art, there may be changes in specific implementation methods and application scope based on the ideas of the present disclosure. In summary, the content of the description should not be understood as a limitation on the present disclosure.

What is claimed is:

1. A audio playing control method performed by an audio output device, wherein the audio output device is configured to establish a Bluetooth connection with each of a first terminal device and a second terminal device, and the method comprises:

receiving a second piece of audio data transmitted from the second terminal device to the audio output device when the first terminal device transmits a first piece of audio data to the audio output device;

determining a target piece of audio data from the first piece of audio data and the second piece of audio data; and playing the target piece of audio data and performing a first processing operation corresponding to a non-target piece of audio data to prevent the audio output device from outputting the non-target piece of audio data, wherein the non-target piece of audio data is another piece of audio data of the first piece of audio data and the second piece of audio data other than the target piece of audio data;

wherein the playing the target piece of audio data and performing a first processing operation corresponding to a non-target piece of audio data comprises:

playing the target piece of audio data in response to a service type corresponding to the non-target piece of audio data being a call service, and transmitting a call processing instruction to a non-target terminal device, wherein the non-target terminal device is a terminal device of the first terminal device and the second terminal device that transmits the non-target piece of audio data to the audio output device, the call processing instruction is configured to trigger the non-target terminal device to stop transmitting the non-target piece of audio data to the audio output device and perform a second processing operation corresponding to the call service of the non-target terminal device.

2. The method according to claim 1, wherein the determining a target piece of audio data from the first piece of audio data and the second piece of audio data comprises:

determining a priority of each of the first piece of audio data and the second piece of audio data based on a service type of the each of the first piece of audio data and the second piece of audio data and determining a piece of audio data of the first piece of audio data and the second piece of audio data with the greatest priority as the target piece of audio data.

3. The method according to claim 2, wherein the service type comprises a call service and a media service, the determining a priority of each of the first piece of audio data and the second piece of audio data based on a service type of the each of the first piece of audio data and the second piece of audio data and determining a piece of audio data of the first piece of audio data and the second piece of audio data with the greatest priority as the target piece of audio data comprises:

determining that the priority of the second piece of audio data is greater than the priority of the first piece of audio data and determining the second piece of audio data as the target piece of audio data in response to the service type corresponding to the second piece of audio data being the call service; or determining that the priority of the first piece of audio data is greater than the priority of the second piece of audio data and determining the first piece of audio data as the target piece of audio data in response to the service type corresponding to the second piece of audio data being the media service.

4. The method according to claim 1, wherein the playing the target piece of audio data and performing a first processing operation corresponding to a non-target piece of audio data comprises:

playing the target piece of audio data and putting the non-target piece of audio data on mute.

5. The method according to claim 4, wherein the putting the non-target piece of audio data on mute comprises:

discarding the received non-target piece of audio data to prevent the audio output device from decoding and playing the non-target piece of audio data.

6. The method according to claim 4, wherein the putting the non-target piece of audio data on mute comprises:

setting a volume corresponding to the non-target piece of audio data to be 0, and mixing the target piece of audio data with the non-target piece of audio data of which the volume is set to be 0 to obtain a mixed output data; and playing the mixed output data.

7. The method according to claim 1, wherein the playing the target piece of audio data in response to a service type corresponding to the non-target piece of audio data being a call service comprises:

outputting an answering prompt information in response to each of the service type corresponding to the non-target piece of audio data and the service type corresponding to the target piece of audio data being the call service; and responding to a first switch instruction corresponding to a first call answering operation and playing the target piece of audio data in response to the first call answering operation corresponding to the answering prompt information being detected.

8. The method according to claim 7, wherein after the responding to a first switch instruction corresponding to a first call answering operation and playing the target piece of audio data in response to the first call answering operation corresponding to the answering prompt information being detected, the method further comprises:

responding to a second switch instruction corresponding to a call switch operation and switching to play the target piece of audio data or the non-target piece of audio data in turn in response to the call switch operation on the audio output device being detected.

9. The method according to claim 1, wherein the call processing instruction comprises a call loudspeaker instruction, and the transmitting a call processing instruction to a non-target terminal device comprises:

transmitting the call loudspeaker instruction to the non-target terminal device, wherein the second processing operation performed by the non-target terminal device in response to the non-target terminal device being triggered by the call loudspeaker instruction comprises externally playing the non-target piece of audio data through a loudspeaker.

10. The method according to claim 1, wherein the call processing instruction comprises a call suspending instruction, and the transmitting a call processing instruction to a non-target terminal device comprises:

transmitting the call suspending instruction to the non-target terminal device, wherein the second processing operation performed by the non-target terminal device in response to the non-target terminal device being triggered by the call suspending instruction comprises transmitting a suspending prompt sound to a call object corresponding to the non-target terminal device and setting the call service of the non-target terminal device to be a suspending state.

11. The method according to claim 1, wherein after the playing the target piece of audio data and performing a first processing operation corresponding to a non-target piece of audio data, the method further comprises:

responding to a third switch instruction, stopping playing the target piece of audio data based on the third switch instruction, and playing the non-target piece of audio data.

12. An audio output device comprising a memory and a processor, wherein the audio output device is configured to establish a Bluetooth connection with each of a first terminal device and a second terminal device, a computer program is stored in the memory, and when being executed by the processor, the computer program causes the processor to execute:

receiving a second piece of audio data transmitted from the second terminal device to the audio output device when the first terminal device transmits a first piece of audio data to the audio output device;

determining a target piece of audio data from the first piece of audio data and the second piece of audio data; and playing the target piece of audio data and performing a first processing operation corresponding to a non-target piece of audio data to prevent the audio output device from outputting the non-target piece of audio data, wherein the non-target piece of audio data is another piece of audio data of the first piece of audio data and the second piece of audio data other than the target piece of audio data;

wherein the playing the target piece of audio data and performing a first processing operation corresponding to a non-target piece of audio data comprises:

playing the target piece of audio data in response to a service type corresponding to the non-target piece of audio data being a call service, and transmitting a call processing instruction to a non-target terminal device, wherein the non-target terminal device is a terminal device of the first terminal device and the second terminal device that transmits the non-target piece of audio data to the audio output device, the call processing instruction is configured to trigger the non-target terminal device to stop transmitting the non-target piece of audio data to the audio output device and perform a second processing operation corresponding to the call service of the non-target terminal device.

13. The audio output device according to claim 12, wherein the determining a target piece of audio data from the first piece of audio data and the second piece of audio data comprises:

determining a priority of each of the first piece of audio data and the second piece of audio data based on a service type of the each of the first piece of audio data and the second piece of audio data and determining a piece of audio data of the first piece of audio data and the second piece of audio data with the greatest priority as the target piece of audio data.

14. The audio output device according to claim 13, wherein the service type comprises a call service and a media service, the determining a priority of each of the first piece of audio data and the second piece of audio data based on a service type of the each of the first piece of audio data and the second piece of audio data and determining a piece of audio data of the first piece of audio data and the second piece of audio data with the greatest priority as the target piece of audio data comprises:

determining that the priority of the second piece of audio data is greater than the priority of the first piece of audio data and determining the second piece of audio data as the target piece of audio data in response to the service type corresponding to the second piece of audio data being the call service; or determining that the priority of the first piece of audio data is greater than the priority of the second piece of audio data and determining the first piece of audio data as the target piece of audio data in response to the service type corresponding to the second piece of audio data being the media service.

* * * * *